United States Patent
Watson

(10) Patent No.: US 9,395,966 B1
(45) Date of Patent: Jul. 19, 2016

(54) SYSTEMS AND METHODS FOR ASSOCIATING INSTALLED SOFTWARE COMPONENTS WITH SOFTWARE PRODUCTS

(75) Inventor: David Watson, American Fork, UT (US)

(73) Assignee: Symantec Corporation, Mountain View, CA (US)

( * ) Notice: Subject to any disclaimer, the term of this patent is extended or adjusted under 35 U.S.C. 154(b) by 1033 days.

(21) Appl. No.: 12/891,258

(22) Filed: Sep. 27, 2010

(51) Int. Cl.
*G06F 9/445* (2006.01)

(52) U.S. Cl.
CPC .................................. *G06F 8/60* (2013.01)

(58) Field of Classification Search
None
See application file for complete search history.

(56) References Cited

U.S. PATENT DOCUMENTS

| | | | | |
|---|---|---|---|---|
| 5,302,947 | A * | 4/1994 | Fuller | G06F 9/4415 340/5.42 |
| 5,894,311 | A * | 4/1999 | Jackson | 345/440 |
| 6,122,663 | A * | 9/2000 | Lin | G06F 9/50 709/224 |
| 7,120,645 | B2 * | 10/2006 | Manikutty et al. | |
| 7,254,808 | B2 * | 8/2007 | Trappen et al. | 717/143 |
| 7,702,668 | B2 * | 4/2010 | Bloesch | 707/617 |
| 8,321,840 | B2 * | 11/2012 | Nagarajan | G06F 8/33 717/106 |
| 8,429,032 | B2 * | 4/2013 | Greenbaum et al. | 705/28 |
| 8,516,008 | B1 * | 8/2013 | Marquardt et al. | 707/802 |
| 8,725,418 | B2 * | 5/2014 | Aerts et al. | 702/19 |
| 2006/0085394 | A1 * | 4/2006 | Barsness et al. | 707/3 |
| 2012/0117234 | A1 * | 5/2012 | Miryanov et al. | 709/224 |

FOREIGN PATENT DOCUMENTS

EP 2395438 A1 * 12/2011

* cited by examiner

*Primary Examiner* — Evral E Bodden
(74) *Attorney, Agent, or Firm* — ALG Intellectual Property, LLC

(57) ABSTRACT

A computer-implemented method for associating installed software components with software products. The method may include 1) maintaining a catalog of software products that may be installed on a computing system, each entry in the catalog comprising a software product and a corresponding set of regular expressions, 2) identifying a software component installed on the computing system, 3) searching the product catalog for a software product that matches the installed software component by, for one or more software products in the product catalog, determining whether the set of regular expressions corresponding to the software product matches information that identifies the installed software component, and 4) associating the installed software component with the software product whose set of regular expressions matches the information that identifies the installed software component. Various other methods, systems, and computer-readable media are also disclosed.

14 Claims, 5 Drawing Sheets

SYSTEMS AND METHODS FOR ASSOCIATING INSTALLED SOFTWARE COMPONENTS WITH SOFTWARE PRODUCTS

BACKGROUND

Organizations implement Information Technology ("IT") systems for the vital business value they provide. Such organizations are continually faced with maintaining IT infrastructure and prioritizing technology purchases. Unfortunately, many IT organizations do not have adequate information to make well-informed IT management decisions. For example, organizations may not know which software products are installed on enterprise endpoints, which software licenses are being used or not used, or how frequently licensed software is used.

Traditional asset management systems may attempt to track licensed software by tracking files of an installed software program. However, since files change as software programs are patched, updated, and upgraded, attempting to track files may be ineffective and often fails to identify installed software programs. As an alternative, software publishers may tag their software with a tag recognized by an asset management system. While tagging software may enable more accurate identification than tracking files, many software publishers may not provide tags for their software. Furthermore, even if a publisher decides to start providing tags for their software, legacy software applications from that publisher may not have been tagged. What is needed, therefore, is a more effective mechanism for identifying and tracking installed software applications.

SUMMARY

As will be described in greater detail below, the instant disclosure generally relates to systems and methods for associating installed software components with software products. For example, a computer-implemented method for associating installed software components with software products may include: 1) maintaining a catalog of software products that may be installed on a computing system, each entry in the catalog identifying a software product and a corresponding set of regular expressions, 2) identifying a software component installed on the computing system, 3) searching the product catalog for a software product that matches the installed software component by, for one or more software products in the product catalog, determining whether the set of regular expressions corresponding to the software product matches information that identifies the installed software component, and 4) associating the installed software component with the software product whose set of regular expressions matches the information that identifies the installed software component.

In at least one embodiment, identifying the software component may include collecting the information that identifies the installed software component, and the information that identifies the installed software component may include a set of text strings. In such embodiments, collecting the information that identifies the installed software component may include at least one of: 1) scanning a software installation database, 2) scanning the computing system for files associated with the installed software component, 3) creating a hash of a file associated with the installed software component, 4) scanning the computing system for registry entries associated with the installed software component, 5) identifying a name of the installed software component, 6) identifying a publisher of the installed software component, 7) identifying a version of the installed software component.

According to certain embodiments, the set of regular expressions may include at least one of: a regular expression that identifies a name of the software component, a regular expression that identifies a publisher of the installed software component, and a regular expression that identifies a version of the installed software component.

In various embodiments, regular expressions may be implemented using any suitable syntax that defines relationships between text strings using one or more operators. As an example, the set of regular expressions may include a regular expression that identifies first and second alternative text strings (e.g., using an "or" operator"), and determining whether the set of regular expressions corresponding to the software product matches information that identifies the installed software component may include: 1) determining whether either the first or second text strings match information that identifies the installed software component, and 2) determining that the regular expression matches the information that identifies the installed software component if either the first or second text strings match information that identifies the installed software component.

As another example, the set of regular expressions may include a regular expression that identifies a first text string that is required to be present for a match and a second text string that is required to be absent for a match (e.g., using a "not" operator"), and determining whether the set of regular expressions corresponding to the software product matches information that identifies the installed software component may include: 1) determining whether either the first and second text strings match information that identifies the installed software component, and 2) determining that the regular expression matches the information that identifies the installed software component if the first text string matches information that identifies the installed software component and the second text string does not match information that identifies the installed software component.

According to at least one embodiment, determining whether the set of regular expressions corresponding to the software product matches information that identifies the installed software component may include at least one of: (1) for each regular expression in the set of regular expressions, converting the regular expression to a nondeterministic finite automaton and running the nondeterministic finite automaton using the information that identifies the installed software component as input, or (2) for each regular expression in the set of regular expressions, converting the nondeterministic finite automaton into a deterministic finite automaton and running the deterministic finite automaton using the information that identifies the installed software component as input.

In some embodiments, determining whether the set of regular expressions corresponding to the software product matches information that identifies the installed software component may include, for each regular expression in the set of regular expressions, using a backtracking algorithm to determine whether the regular expression matches the information that identifies the installed software component.

In certain embodiments, a system for associating installed software components with software products may include: 1) a maintenance module programmed to maintain a catalog of software products that may be installed on a computing system, each entry in the catalog comprising a software product and a corresponding set of regular expressions, 2) an identification module programmed to identify a software component installed on the computing system, 3) an analysis module programmed to search the product catalog for a software product that matches the installed software component by, for one or more software products in the product catalog, determining whether the set of regular expressions corresponding to the software product matches information that identifies the installed software component, 4) an association module programmed to associate the installed software component with the software product whose set of regular expressions matches the information that identifies the installed software component, and 5) one or more processors configured to execute the maintenance module, the identification module, the analysis module, and the association module.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
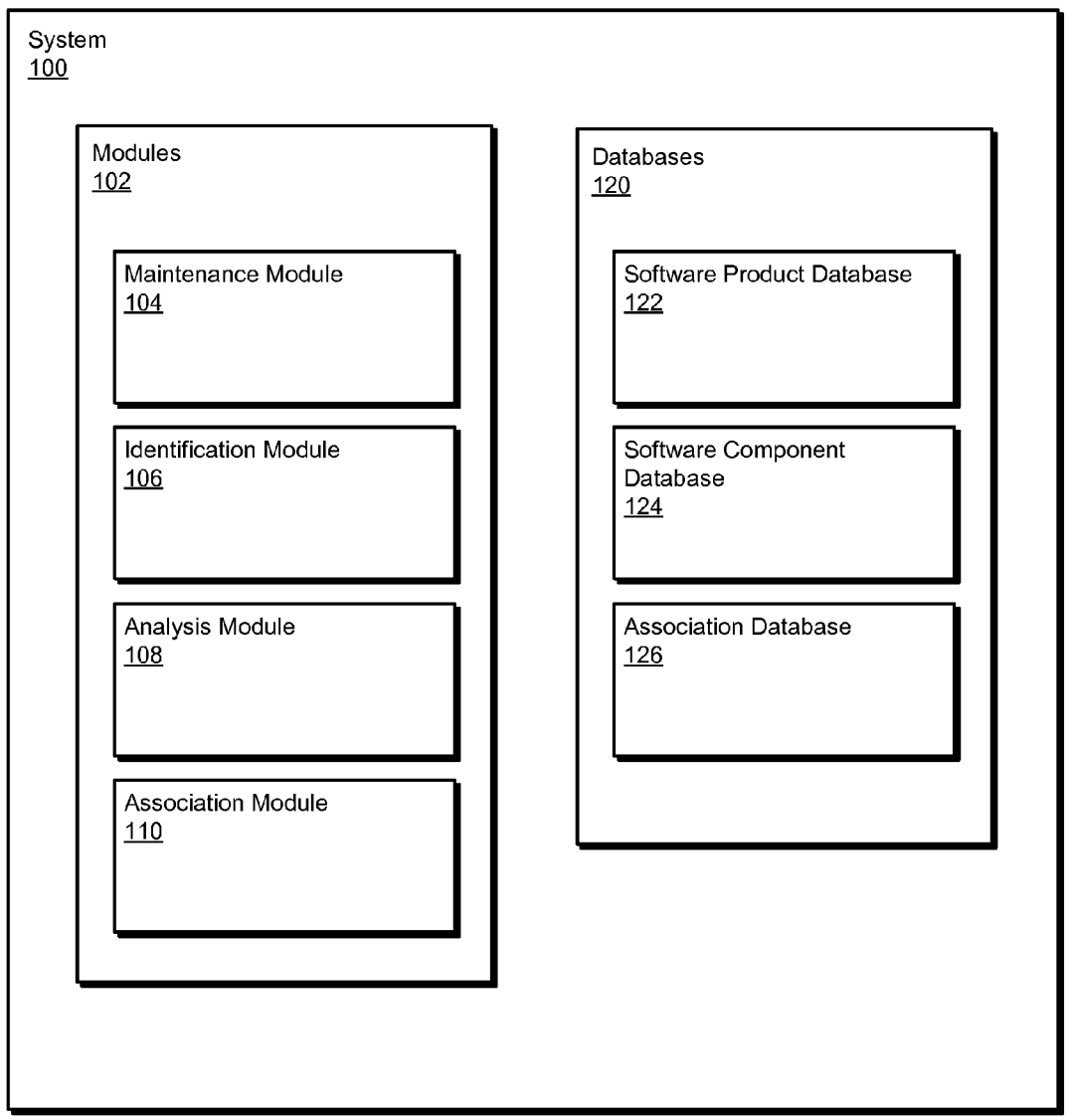
FIG. 1 is a block diagram of an exemplary system for associating installed software components with software products.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

As will be described in greater detail below, the instant disclosure generally relates to systems and methods for associating installed software components with software products. Embodiments of the instant disclosure may provide more effective mechanisms for associating installed software components with software products than traditional asset-management systems. For example, according to embodiments disclosed herein, an asset management system of an enterprise may maintain a catalog of software products and regular expressions that identify attributes (e.g., name, publisher, version, etc.) of the software products. When a software component is identified on a computing system in the enterprise, the asset management system may search the catalog of software products for a software product that matches the software component installed on the computing system. In searching for a match, the asset management system may compare information identifying the installed software component with regular expressions associated with software products in the catalog of software products. The asset management system may associate the installed software component with a software product whose set of regular expressions matches the information that identifies the installed software component.

By implementing a probabilistic logic formula in performing a reverse search for a software product that matches an installed software component, embodiments of the instant disclosure may be able to maintain associations between installed software components and software products even as the installed software components are patched, updated, and upgraded. Embodiments of the instant disclosure may also be more efficient and accurate in creating associations between installed software components and software products.

By improving accuracy and efficiency in tracking installed software components, embodiments of the instant disclosure may provide various benefits in implementing asset management. For example, embodiments of the present disclosure may facilitate providing accurate information about which software applications are installed across an enterprise network and their associated licenses. Embodiments of the instant disclosure may also facilitate tracking the usage of licensed software, enabling IT administrators to more efficiently manage enterprise software. Embodiments of the instant disclosure may also provide various other features and advantages over traditional asset management solutions.

Figure 2:
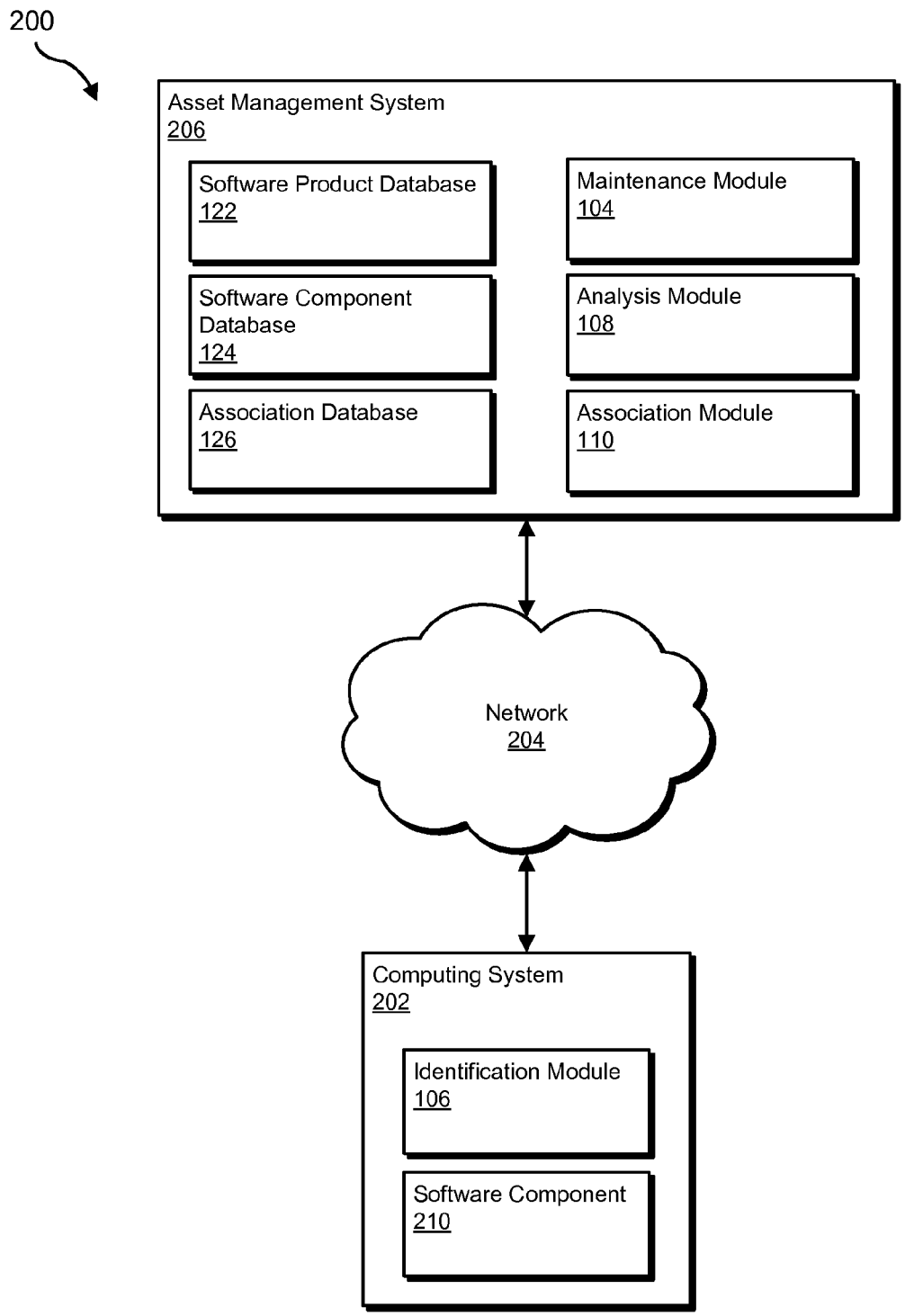
FIG. 2 is a block diagram of another exemplary system for associating installed software components with software products.

The following will provide, with reference to FIGS. 1-2, detailed descriptions of exemplary systems for associating installed software components with software products. Detailed descriptions of corresponding computer-implemented methods will also be provided in connection with FIG. 3. In addition, detailed descriptions of an exemplary computing system and network architecture capable of implementing one or more of the embodiments described herein will be provided in connection with FIGS. 4 and 5, respectively.

FIG. 1 is a block diagram of an exemplary system 100 for associating installed software components with software products. As illustrated in this figure, exemplary system 100 may include one or more modules 102 for performing one or more tasks. For example, and as will be explained in greater detail below, exemplary system 100 may include a maintenance module 104 programmed to maintain a catalog of software products that may be installed on a computing system, where each entry in the catalog includes a software product and a corresponding set of regular expressions. Exemplary system 100 may also include an identification module 106 programmed to identify a software component installed on the computing system.

In addition, and as will be described in greater detail below, exemplary system 100 may include an analysis module 108 programmed to search the product catalog for a software product that matches the installed software component by, for one or more software products in the product catalog, determining whether the set of regular expressions corresponding to the software product matches information that identifies the installed software component. System 100 may also include an association module 110 programmed to associate the installed software component with the software product whose set of regular expressions matches information that identifies the installed software component. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, as will be described in greater detail below, one or more of modules 102 may represent software modules stored and configured to run on one or more computing devices, such as the devices illustrated in FIG. 2 (e.g., computing system 202 and/or asset management system 206), computing system 410 in FIG. 4, and/or portions of exemplary network architecture 500 in FIG. 5. One or more of modules 102 in FIG. 1 may also represent all or portions of one or more special-purpose computers configured to perform one or more tasks.

As illustrated in FIG. 1, exemplary system 100 may also include one or more databases 120. Databases 120 may represent portions of a single database or computing device or a plurality of databases or computing devices. In one embodiment, exemplary system 100 may include a software product database 122 for cataloging software products and, for each software product, a set of regular expressions that identifies the software product. System 100 may also include a software component database 124 for storing software components identified on one or more computing systems in an enterprise. System 100 may further include an association database 126 that stores associations between software products and installed software components. While represented as different databases in FIG. 1, software product database 122, software component database 124, and association database 126 may represent portions of a single database.

Databases 120 in FIG. 1 may represent a portion of one or more computing devices. For example, databases 120 may represent a portion of asset management system 206 in FIG. 2, computing system 410 in FIG. 4, and/or portions of exemplary network architecture 500 in FIG. 5. Alternatively, databases 120 in FIG. 1 may represent one or more physically separate devices capable of being accessed by a computing device, such as asset management system 206 in FIG. 2, computing system 410 in FIG. 4 and/or portions of exemplary network architecture 500 in FIG. 5.

Exemplary system 100 in FIG. 1 may be deployed in a variety of ways. For example, all or a portion of exemplary system 100 may represent portions of a cloud-computing or network-based environment, such as exemplary system 200 illustrated in FIG. 2. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

As shown in FIG. 2, system 200 may include a computing system 202 in communication with an asset management system 206 via a network 204. As shown. computing system 202 may include identification module 106 and a software component 210. Asset management system 206 may include software product database 122, software component database 124, association database 126, maintenance module 104, analysis module 108, and association module 110. In some embodiments, one or more of the modules and/or databases shown in asset management system 206 may be implemented on computing system 202. Similarly, identification module 106 may be fully or partially implemented on asset management system 206.

Asset management system 206 generally represents any system for tracking and managing software assets of an enterprise. Examples of asset management system 206 include, without limitation, application servers and database servers configured to provide various database services and/or run certain software applications.

In the example shown in FIG. 2, computing system 202 represents a computer managed by asset management system 206. Computing system 202 generally represents any type or form of computing system capable of reading computer-executable instructions. Examples of computing system 202 include, without limitation, laptops, desktops, servers, cellular phones, personal digital assistants (PDAs), multimedia players, embedded systems, combinations of one or more of the same, exemplary computing system 410 in FIG. 4, or any other suitable computing device.

Network 204 generally represents any medium or architecture capable of facilitating communication or data transfer. Examples of network 204 include, without limitation, an intranet, a wide area network (WAN), a local area network (LAN), a personal area network (PAN), the Internet, power line communications (PLC), a cellular network (e.g., a GSM Network), exemplary network architecture 500 in FIG. 5, or the like. Network 204 may facilitate communication or data transfer using wireless or wired connections. In one embodiment, network 204 may facilitate communication between computing system 202 and asset management system 206.

Figure 3:
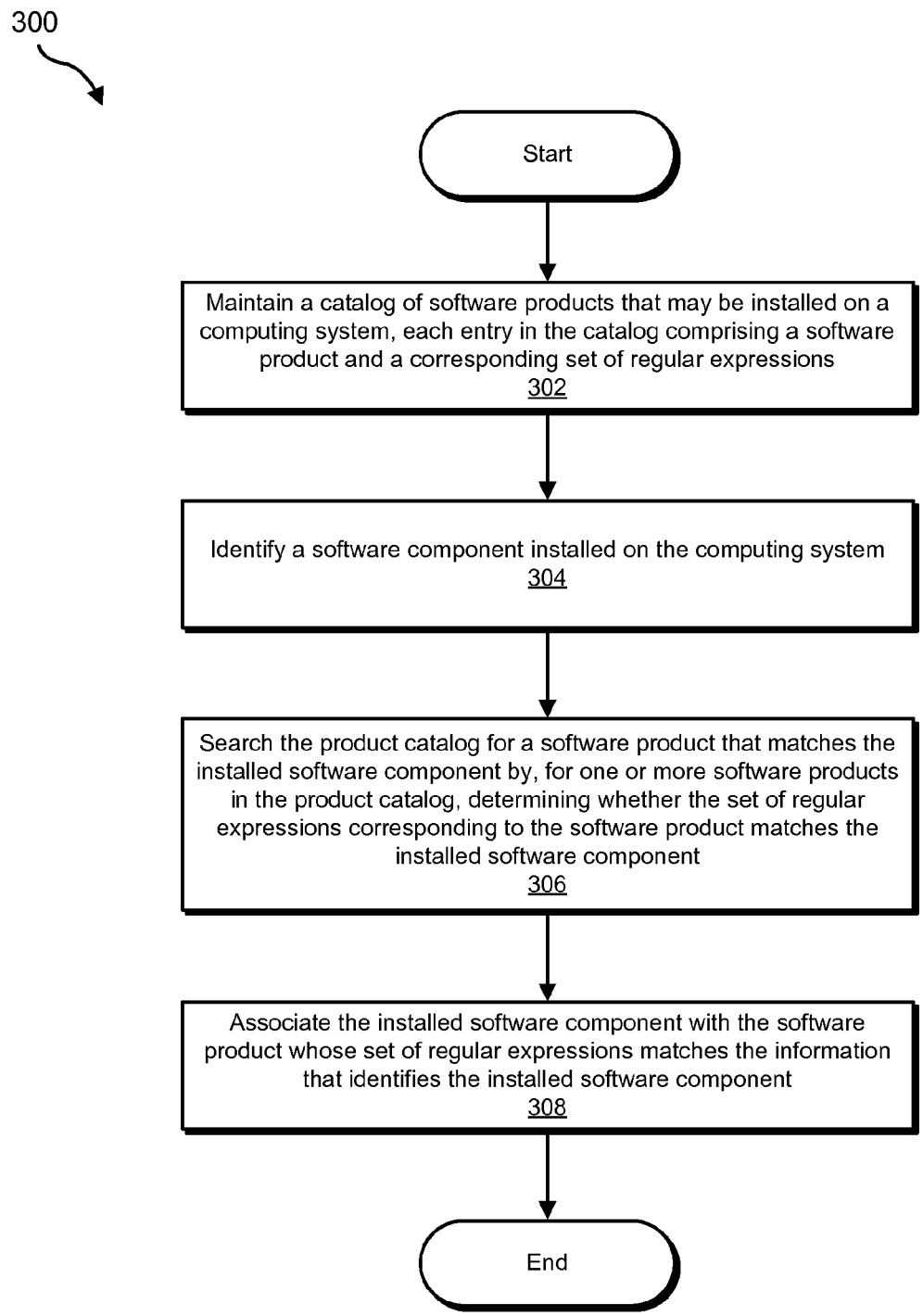
FIG. 3 is a flow diagram of an exemplary method for associating installed software components with software products.

FIG. 3 is a flow diagram of an exemplary computer implemented method 300 for associating installed software components with software products. The steps shown in FIG. 3 may be performed by any suitable computer-executable code and/or computing system. In some embodiments, the steps shown in FIG. 3 may be performed by one or more of the components of system 100 in FIG. 1 and/or system 200 in FIG. 2.

At step 302 in FIG. 3, one or more of the systems described herein may maintain a catalog of one or more software products that may be installed on a computing system, where each entry in the catalog comprises a software product and a corresponding set of one or more regular expressions. For example, maintenance module 104 in FIG. 1 (which may, as detailed above, represent a portion of asset management system 206 in FIG. 2) maintain software product database 122. As used herein, the phrase "software product" generally refers to any type or form of software program that may be installed on a computing system. The phrase "catalog of software products" generally refers to any database or other data structure that identifies a set of software products managed by an organization (e.g., a company, a school, a government entity, etc.).

Maintenance module 104 may maintain a catalog of software products in a variety of ways. For example, maintenance module 104 may be part of a software asset management program that enables an administrator to manage software within an enterprise. The administrator may interface with maintenance module 104 to add and remove software products from the catalog. The administrator may also create regular expressions associated with each software product in the catalog of software products. Additionally or alternatively, regular expressions may be provided by a software publisher of the software product, a third-party, and/or in any other suitable manner. These regular expressions may be regular expressions identifying a name of a software product, a publisher of a software product, a version of software product, and/or any other suitable information about a software product.

As used herein, the phrase "regular expression" generally refers to a notation for describing a set of character strings. A regular expression may be defined using any suitable regular expression syntax with any type or form of language for creating regular expressions. A regular expression may include any combination of character strings and operators. In some embodiments, regular expressions may define relationships between character strings using boolean operators (e.g., 'and' operators, 'or' operators, 'not' operators, etc.). A string that is in a set described by a regular expression may be said to match the regular expression.

The following is an example of a set of regular expressions associated with a cataloged software product ADOBE PHOTOSHOP CS4. An administrator may enter a first regular expression for the name of the software product:

Adobe Photoshop CS4 -light -room -64 -support

Similarly, the administrator may enter the following regular expression to identify a publisher of ADOBE PHOTOSHOP:

Adobe | "Adobe System" | "Adobe.sys"

The administrator may also enter the following regular expression to define a version of ADOBE PHOTOSHOP:

11

In the foregoing example, the "-" symbol represents a "not" operation, the "|" symbol represents an "or" operation, and quotation marks are used to define literal strings. The foregoing example is merely exemplary and any other suitable syntax may be used to create regular expressions.

At step 304, one or more of the systems described herein may identify a software component installed on the computing system. For example, identification module 106 may identify software component 210 installed on computing system 202 in FIG. 2. As used herein, the phrase "software component" refers to any executable code installed on a computing system. For example, a software component may be an installed instance of a software product identified in a software catalog of an enterprise.

A software component may be identified by identification module 106 in a variety of contexts and ways. For example, identification module 106 may identify a software component by scanning a software installation database (e.g., a MICROSOFT INSTALLER ("MSI") database), by scanning a computing system for files and/or registry entries associated with a software component, when a the software component is installed, when the software component is added to an add-remove programs database, and/or in any other suitable manner.

In some embodiments, identification module 106 may collect information that identifies an installed software component when identifying the installed software component. For example, identification module 106 may identify a name of the installed software component, a publisher of the installed software component, a version of the installed software component, may create a hash of a file of the installed software component, and/or may obtain any other information associated with the installed software component. Identification information may be collected from files associated with the software component (e.g., from metadata of an executable file), from registry entries associated with the software component, and/or from a variety of other sources. The identification information may stored in a database, such as software component database 124, where it is associated with a corresponding installed software component.

At step 306, one or more of the systems described herein may search the product catalog for a software product that matches the installed component by, for one or more software products in the product catalog, determining whether the set of regular expressions corresponding to the software product matches information that identifies the installed software component. For example, analysis module 108 may search software product database 122 for a software product that matches the previously identified installed component.

Analysis module 108 may search software product database 122 in any suitable manner. For example, analysis module 108 may search software product database 122 for a software product that matches the identified software component by comparing regular expressions of each software product in software database 122 with information that identifies the installed software component until a match is found.

In some embodiments, the information that identifies the installed software component may include one or more of a variety of text strings. For example, the information that identifies the software component may include one or more words in a name of the software component, a version number of the software component, one or more words identifying a publisher of the software component, etc. This identification information may be stored in a table in software component database 124, and the table may include columns for each category of data (e.g., name, publisher, version number, etc.).

When searching software product database 122 for a match to an installed software component, analysis module 108 may iterate through each entry in software product database 122 until a match is found. To compare the installed software component with a software product in database 122, analysis module 108 may compare a regular expression associated with the software product with corresponding identification information of the installed software component. For example, a regular expression that identifies a name of the software product may be compared against identification information that identifies a name of the software component, a regular expression that identifies a publisher of the software product may be compared against identification information that identifies a publisher of the software component, and a regular expression that identifies a version of the software product may be compared against identification information that identifies a version of the software component. If the identification information of the software component matches each of these regular expressions, analysis module 108 may conclude that the software component matches the software product associated with the regular expressions.

In certain embodiments, the set of regular expressions may include a regular expression that identifies first and second alternative text strings (e.g., an "or" operation). In such situations, determining whether the set of regular expressions corresponding to the software product matches information that identifies the installed software component may include determining whether either the first or second text strings match information that identifies the installed software component. A determination that the regular expression matches information that identifies the installed software component be made if either the first or second text strings match information that identifies the installed software component.

Additionally or alternatively, the set of regular expressions may include a regular expression that identifies a first text string that is required to be present for a match and a second text string that is required to be absent for a match (e.g., a "not" operation). In such situations, determining that the regular expression matches the information that identifies the installed software component may include determining that the first text string matches information that identifies the installed software component and the second text string does not match information that identifies the installed software component. As previously noted, embodiments of the instant disclosure may also be implemented using a variety of other operators.

In some embodiments, determining whether the set of regular expressions corresponding to the software product matches information that identifies the installed software component may include, for each regular expression in the set of regular expressions, converting the regular expression to a finite automaton and running the finite automaton using the information that identifies the installed software component as input.

As used herein, the phrase "finite automaton" refers to a state machine that is always in one of its states. As a finite automaton reads a string, the finite automaton may switch from state to state. Such an automaton may read an input string one character at a time.

A finite automaton may be referred to as being nondeterministic if one state of the automaton has multiple choices for a subsequent state. In other words, a nondeterministic finite automaton may be an automaton that, for one or more states, there may be several possible next states. In contrast, a deterministic finite automaton is a finite automaton where, for any given state, the next state is uniquely determined. Any nondeterministic finite automaton may be converted into a deterministic finite automaton.

In some embodiments, determining whether the set of regular expressions corresponding to the software product matches information that identifies the installed software component may include, for each regular expression in the set of regular expressions, converting the regular expression to a nondeterministic finite automaton and running the nondeterministic finite automaton using the information that identifies the installed software component as input. Alternatively, determining whether the set of regular expressions corresponding to the software product matches information that identifies the installed software component may include, for each regular expression in the set of regular expressions, converting the nondeterministic finite automaton into a deterministic finite automaton and running the deterministic finite automaton using the information that identifies the installed software component as input.

In some embodiments, determining whether the set of regular expressions corresponding to the software product matches information that identifies the installed software component may include, for each regular expression in the set of regular expressions, using a regular expression backtracking algorithm to determine whether the regular expression matches the information that identifies the installed software component. A backtracking algorithm may be implemented by guessing one option for matching and, if that option does not work, selecting an alternative option for matching.

At step 308, one or more the systems described herein may associate the installed software component with the software product whose set of regular expressions matches the information that identifies the installed software component. For example, association module 110 may associate the installed software component with a software product from software product database 122 whose set of regular expressions matches information that identifies the software component. Associations between installed software components and cataloged software products may be stored in association database 126 and/or in any other suitable manner. Such an association may facilitate licensing, security, backup of software programs, and various other tasks performed by system administrators.

Figure 4:
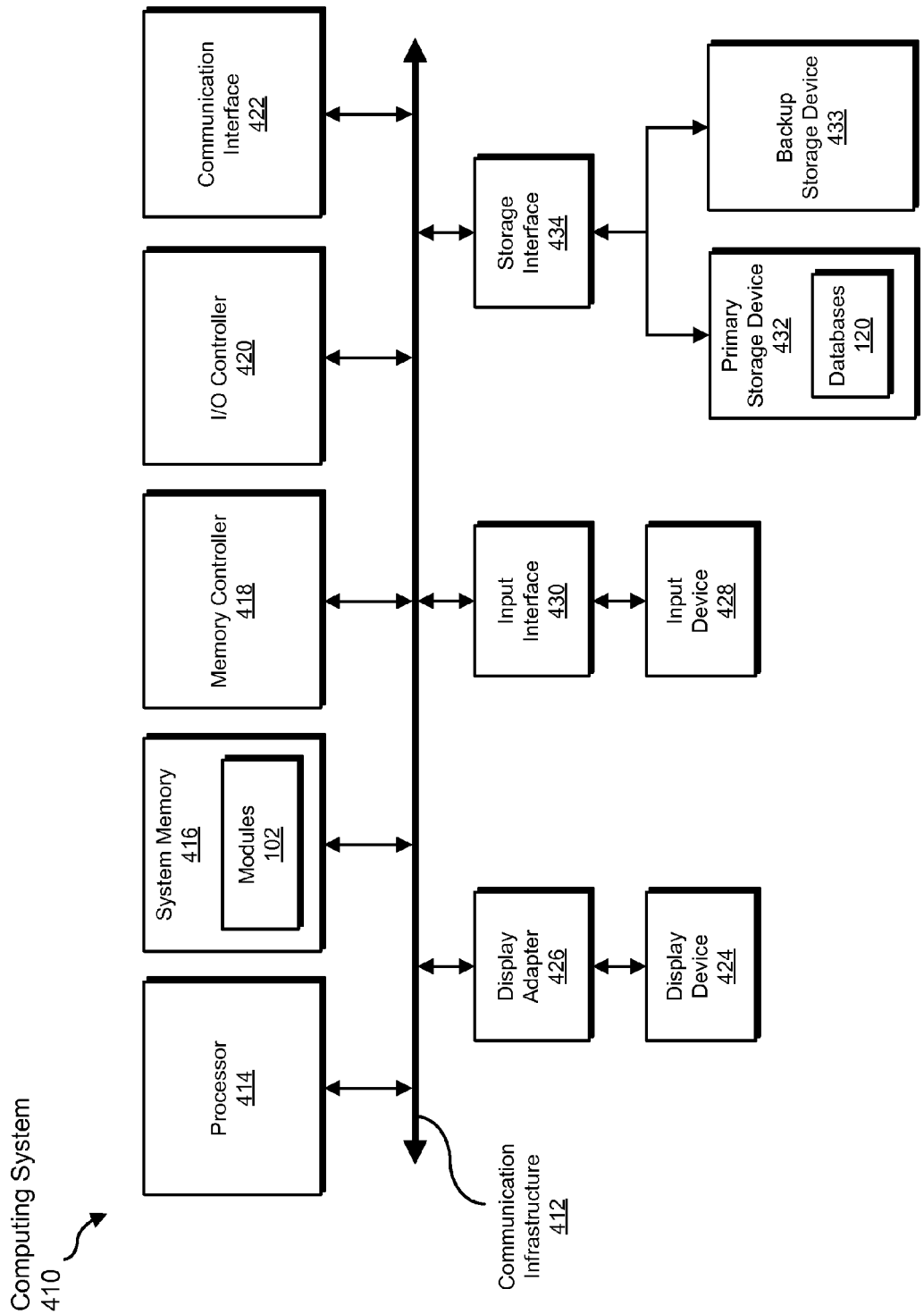
FIG. 4 is a block diagram of an exemplary computing system capable of implementing one or more of the embodiments described and/or illustrated herein.

FIG. 4 is a block diagram of an exemplary computing system 410 capable of implementing one or more of the embodiments described and/or illustrated herein. Computing system 410 broadly represents any single or multi-processor computing device or system capable of executing computer-readable instructions. Examples of computing system 410 include, without limitation, workstations, laptops, client-side terminals, servers, distributed computing systems, handheld devices, or any other computing system or device. In its most basic configuration, computing system 410 may include at least one processor 414 and a system memory 416.

Processor 414 generally represents any type or form of processing unit capable of processing data or interpreting and executing instructions. In certain embodiments, processor 414 may receive instructions from a software application or module. These instructions may cause processor 414 to perform the functions of one or more of the exemplary embodiments described and/or illustrated herein. For example, processor 414 may perform and/or be a means for performing, either alone or in combination with other elements, one or more of the maintaining, identifying, searching, associating, determining, collecting, scanning, creating, converting, and running steps described herein. Processor 414 may also perform and/or be a means for performing any other steps, methods, or processes described and/or illustrated herein.

System memory 416 generally represents any type or form of volatile or non-volatile storage device or medium capable of storing data and/or other computer-readable instructions. Examples of system memory 416 include, without limitation, random access memory (RAM), read only memory (ROM), flash memory, or any other suitable memory device. Although not required, in certain embodiments computing system 410 may include both a volatile memory unit (such as, for example, system memory 416) and a non-volatile storage device (such as, for example, primary storage device 432, as described in detail below). In one example, one or more of modules 102 from FIG. 1 may be loaded into system memory 416.

In certain embodiments, exemplary computing system 410 may also include one or more components or elements in addition to processor 414 and system memory 416. For example, as illustrated in FIG. 4, computing system 410 may include a memory controller 418, an Input/Output (I/O) controller 420, and a communication interface 422, each of which may be interconnected via a communication infrastructure 412. Communication infrastructure 412 generally represents any type or form of infrastructure capable of facilitating communication between one or more components of a computing device. Examples of communication infrastructure 412 include, without limitation, a communication bus (such as an ISA, PCI, PCIe, or similar bus) and a network.

Memory controller 418 generally represents any type or form of device capable of handling memory or data or controlling communication between one or more components of computing system 410. For example, in certain embodiments memory controller 418 may control communication between processor 414, system memory 416, and I/O controller 420 via communication infrastructure 412. In certain embodiments, memory controller may perform and/or be a means for performing, either alone or in combination with other elements, one or more of the steps or features described and/or illustrated herein, such as maintaining, identifying, searching, associating, determining, collecting, scanning, creating, converting, and running.

I/O controller 420 generally represents any type or form of module capable of coordinating and/or controlling the input and output functions of a computing device. For example, in certain embodiments I/O controller 420 may control or facilitate transfer of data between one or more elements of computing system 410, such as processor 414, system memory 416, communication interface 422, display adapter 426, input interface 430, and storage interface 434. I/O controller 420 may be used, for example, to perform and/or be a means for performing, either alone or in combination with other elements, one or more of the maintaining, identifying, searching, associating, determining, collecting, scanning, creating, converting, and running steps described herein. I/O controller 420 may also be used to perform and/or be a means for performing other steps and features set forth in the instant disclosure.

Communication interface 422 broadly represents any type or form of communication device or adapter capable of facilitating communication between exemplary computing system 410 and one or more additional devices. For example, in certain embodiments communication interface 422 may facilitate communication between computing system 410 and a private or public network including additional computing systems. Examples of communication interface 422 include, without limitation, a wired network interface (such as a network interface card), a wireless network interface (such as a wireless network interface card), a modem, and any other suitable interface. In at least one embodiment, communication interface 422 may provide a direct connection to a remote server via a direct link to a network, such as the Internet. Communication interface 422 may also indirectly provide such a connection through, for example, a local area network (such as an Ethernet network), a personal area network, a telephone or cable network, a cellular telephone connection, a satellite data connection, or any other suitable connection.

In certain embodiments, communication interface 422 may also represent a host adapter configured to facilitate communication between computing system 410 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 422 may also allow computing system 410 to engage in distributed or remote computing. For example, communication interface 422 may receive instructions from a remote device or send instructions to a remote device for execution. In certain embodiments, communication interface 422 may perform and/or be a means for performing, either alone or in combination with other elements, one or more of the maintaining, identifying, searching, associating, determining, collecting, scanning, creating, converting, and running steps disclosed herein. Communication interface 422 may also be used to perform and/or be a means for performing other steps and features set forth in the instant disclosure.

As illustrated in FIG. 4, computing system 410 may also include at least one display device 424 coupled to communication infrastructure 412 via a display adapter 426. Display device 424 generally represents any type or form of device capable of visually displaying information forwarded by display adapter 426. Similarly, display adapter 426 generally represents any type or form of device configured to forward graphics, text, and other data from communication infrastructure 412 (or from a frame buffer, as known in the art) for display on display device 424.

As illustrated in FIG. 4, exemplary computing system 410 may also include at least one input device 428 coupled to communication infrastructure 412 via an input interface 430. Input device 428 generally represents any type or form of input device capable of providing input, either computer or human generated, to exemplary computing system 410. Examples of input device 428 include, without limitation, a keyboard, a pointing device, a speech recognition device, or any other input device. In at least one embodiment, input device 428 may perform and/or be a means for performing, either alone or in combination with other elements, one or more of the maintaining, identifying, searching, associating, determining, collecting, scanning, creating, converting, and running steps disclosed herein. Input device 428 may also be used to perform and/or be a means for performing other steps and features set forth in the instant disclosure.

As illustrated in FIG. 4, exemplary computing system 410 may also include a primary storage device 432 and a backup storage device 433 coupled to communication infrastructure 412 via a storage interface 434. Storage devices 432 and 433 generally represent any type or form of storage device or medium capable of storing data and/or other computer-readable instructions. For example, storage devices 432 and 433 may be a magnetic disk drive (e.g., a so-called hard drive), a floppy disk drive, a magnetic tape drive, an optical disk drive, a flash drive, or the like. Storage interface 434 generally represents any type or form of interface or device for transferring data between storage devices 432 and 433 and other components of computing system 410. In one example, databases 120 from FIG. 1 may be stored in primary storage device 432.

In certain embodiments, storage devices 432 and 433 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 432 and 433 may also include other similar structures or devices for allowing computer software, data, or other computer-readable instructions to be loaded into computing system 410. For example, storage devices 432 and 433 may be configured to read and write software, data, or other computer-readable information. Storage devices 432 and 433 may also be a part of computing system 410 or may be a separate device accessed through other interface systems.

In certain embodiments, storage devices 432 and 433 may be used, for example, to perform and/or be a means for performing, either alone or in combination with other elements, one or more of the maintaining, identifying, searching, associating, determining, collecting, scanning, creating, converting, and running steps disclosed herein. Storage devices 432 and 433 may also be used to perform and/or be a means for performing other steps and features set forth in the instant disclosure.

Many other devices or subsystems may be connected to computing system 410. Conversely, all of the components and devices illustrated in FIG. 4 need not be present to practice the embodiments described and/or illustrated herein. The devices and subsystems referenced above may also be interconnected in different ways from that shown in FIG. 4. Computing system 410 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 410. All or a portion of the computer program stored on the computer-readable medium may then be stored in system memory 416 and/or various portions of storage devices 432 and 433. When executed by processor 414, a computer program loaded into computing system 410 may cause processor 414 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 410 may be configured as an application specific integrated circuit (ASIC) adapted to implement one or more of the exemplary embodiments disclosed herein.

Figure 5:
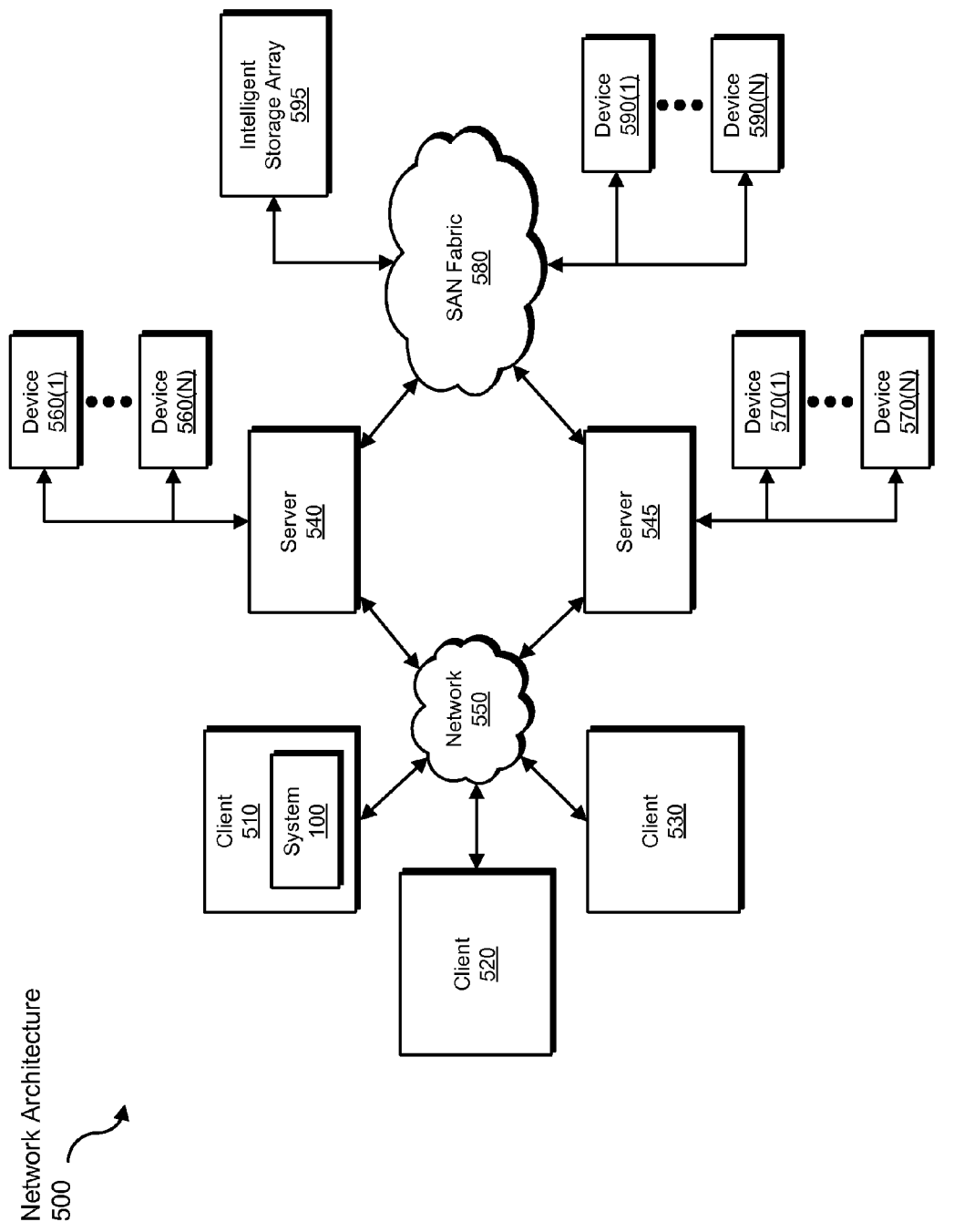
FIG. 5 is a block diagram of an exemplary computing network capable of implementing one or more of the embodiments described and/or illustrated herein.

FIG. 5 is a block diagram of an exemplary network architecture 500 in which client systems 510, 520, and 530 and servers 540 and 545 may be coupled to a network 550. Client systems 510, 520, and 530 generally represent any type or form of computing device or system, such as exemplary computing system 410 in FIG. 4. In one example, client system 510 may include system 100 from FIG. 1.

Similarly, servers 540 and 545 generally represent computing devices or systems, such as application servers or database servers, configured to provide various database services and/or run certain software applications. Network 550 generally represents any telecommunication or computer network including, for example, an intranet, a wide area network (WAN), a local area network (LAN), a personal area network (PAN), or the Internet.

As illustrated in FIG. 5, one or more storage devices 560(1)-(N) may be directly attached to server 540. Similarly, one or more storage devices 570(1)-(N) may be directly attached to server 545. Storage devices 560(1)-(N) and storage devices 570(1)-(N) generally represent any type or form of storage device or medium capable of storing data and/or other computer-readable instructions. In certain embodiments, storage devices 560(1)-(N) and storage devices 570(1)-(N) may represent network-attached storage (NAS) devices configured to communicate with servers 540 and 545 using various protocols, such as NFS, SMB, or CIFS.

Servers 540 and 545 may also be connected to a storage area network (SAN) fabric 580. SAN fabric 580 generally represents any type or form of computer network or architecture capable of facilitating communication between a plurality of storage devices. SAN fabric 580 may facilitate communication between servers 540 and 545 and a plurality of storage devices 590(1)-(N) and/or an intelligent storage array 595. SAN fabric 580 may also facilitate, via network 550 and servers 540 and 545, communication between client systems 510, 520, and 530 and storage devices 590(1)-(N) and/or intelligent storage array 595 in such a manner that devices 590(1)-(N) and array 595 appear as locally attached devices to client systems 510, 520, and 530. As with storage devices 560(1)-(N) and storage devices 570(1)-(N), storage devices 590(1)-(N) and intelligent storage array 595 generally represent any type or form of storage device or medium capable of storing data and/or other computer-readable instructions.

In certain embodiments, and with reference to exemplary computing system 410 of FIG. 4, a communication interface, such as communication interface 422 in FIG. 4, may be used to provide connectivity between each client system 510, 520, and 530 and network 550. Client systems 510, 520, and 530 may be able to access information on server 540 or 545 using, for example, a web browser or other client software. Such software may allow client systems 510, 520, and 530 to access data hosted by server 540, server 545, storage devices 560(1)-(N), storage devices 570(1)-(N), storage devices 590(1)-(N), or intelligent storage array 595. Although FIG. 5 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 540, server 545, storage devices 560(1)-(N), storage devices 570(1)-(N), storage devices 590(1)-(N), intelligent storage array 595, or any combination thereof. All or a portion of one or more of the exemplary embodiments disclosed herein may also be encoded as a computer program, stored in server 540, run by server 545, and distributed to client systems 510, 520, and 530 over network 550. Accordingly, network architecture 500 may perform and/or be a means for performing, either alone or in combination with other elements, one or more of the maintaining, identifying, searching, associating, determining, collecting, scanning, creating, converting, and running steps disclosed herein. Network architecture 500 may also be used to perform and/or be a means for performing other steps and features set forth in the instant disclosure.

As detailed above, computing system 410 and/or one or more components of network architecture 500 may perform and/or be a means for performing, either alone or in combination with other elements, one or more steps of an exemplary method for associating installed software components with software products.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules disclosed herein may transform memory of an association database by creating associations between installed software components and cataloged software products.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for associating installed software components with software products, at least a portion of the method being performed by a computing device comprising at least one processor, the method comprising:
    maintaining a catalog of software products that may be installed on a plurality of computing systems across an enterprise network of an enterprise, each entry in the catalog comprising a software product and a corresponding set of regular expressions;
    identifying a software component installed on the computing systems across the enterprise network;
    searching the product catalog for a software product that matches the installed software component by:
        iterating through each entry in the catalog of software products until identifying a match based at least in part on the set of regular expressions;
        while iterating through the catalog of software products, determining that the set of regular expressions corresponding to the software product matches information that identifies the installed software component by:
            identifying, within the set of regular expressions corresponding to the software product, a regular expression that identifies a first text string that is required to be present for a match and a second text string that is required to be absent for a match, the first and second text strings being alternatives of one another;
            determining that at least one of the first and second text strings matches the information that identifies the installed software component;
            for each regular expression in the set of regular expressions, using a backtracking algorithm to determine that the regular expression matches the information that identifies the installed software component due at least in part to the first text string matching the information that identifies the installed software component and the second text string not matching the information that identifies the installed software component;
    associating the installed software component with the software product whose set of regular expressions matches the information that identifies the installed software component;
    creating a hash of a file associated with the installed software component;
    tracking, using the hash, usage of the software product across the enterprise network at least in part on the association between the installed software component and the software product;
    after the installed software component is patched or updated, continuing to track, using the hash, the usage of the software product across the enterprise network at least in part on the association between the installed software component and the software products;
    providing, for presentation to an Information Technology administrator, licensing information about existing licenses for the software product tracked across the enterprise network to enable the Information Technology administrator to make an informed decision on a future licensing agreement.

2. The method of claim 1, wherein:
    identifying the software component comprises collecting the information that identifies the installed software component;
    the information that identifies the installed software component comprises a set of text strings.

3. The method of claim 2, wherein collecting the information that identifies the installed software component comprises at least one of:
    scanning a software installation database;
    scanning at least one of the computing systems for files associated with the installed software component;
    scanning at least one of the computing systems for registry entries associated with the installed software component;
    identifying a name of the installed software component;
    identifying a publisher of the installed software component;
    identifying a version of the installed software component.

4. The method of claim 1, wherein the set of regular expressions comprises at least one of:
    a regular expression that identifies a name of the software component;
    a regular expression that identifies a publisher of the installed software component;
    a regular expression that identifies a version of the installed software component.

5. The method of claim 1, wherein determining that the set of regular expressions corresponding to the software product matches the information that identifies the installed software component comprises at least one of:
    for each regular expression in the set of regular expressions:
        converting the regular expression to a nondeterministic finite automaton;
        running the nondeterministic finite automaton using the information that identifies the installed software component as input;
    for each regular expression in the set of regular expressions:
        converting the nondeterministic finite automaton into a deterministic finite automaton;

running the deterministic finite automaton using the information that identifies the installed software component as input.

6. The method of claim 1, wherein tracking the usage of the software product comprises tracking licenses for the software product across the enterprise network.

7. The method of claim 6, wherein providing the licensing information for presentation to the Information Technology administrator comprises facilitating licensing of the software product at least in part on the tracked usage of the software product.

8. A system for associating installed software components with software products, the system comprising:
 a maintenance module, stored in memory, that maintains a catalog of software products that may be installed on a plurality of computing systems across an enterprise network of an enterprise, each entry in the catalog comprising a software product and a corresponding set of regular expressions;
 an identification module, stored in memory, that:
  identifies a software component installed on the computing systems across the enterprise network;
  creates a hash of a file associated with the software component;
 an analysis module, stored in memory, that searches the product catalog for a software product that matches the installed software component by:
  iterating through each entry in the catalog of software products until identifying a match based at least in part on the set of regular expressions;
  while iterating through the catalog of software products, determining that the set of regular expressions corresponding to the software product matches information that identifies the installed software component by:
   identifying, within the set of regular expressions corresponding to the software product, a regular expression that identifies a first text string that is required to be present for a match and a second text string that is required to be absent for a match, the first and second text strings being alternatives of one another;
   determining that at least one of the first and second text strings matches the information that identifies the installed software component;
  for each regular expression in the set of regular expressions, using a backtracking algorithm to determine that the regular expression matches the information that identifies the installed software component due at least in part to the first text string matching the information that identifies the installed software component and the second text string not matching the information that identifies the installed software component;
 an association module, stored in memory, that:
  associates the installed software component with the software product whose set of regular expressions matches the information that identifies the installed software component;
  tracks, using the hash, usage of the software product across the enterprise network at least in part on the association between the installed software component and the software product;
  continues to track, using the hash after the installed software component is patched or updated, the usage of the software product across the enterprise network at least in part on the association between the installed software component and the software product;
  provide, for presentation to an Information Technology administrator, licensing information about existing licenses for the software product tracked across the enterprise network to enable the Information Technology administrator to make an informed decision on a future licensing agreement;
 one or more physical processors that execute the maintenance module, the identification module, the analysis module, and the association module.

9. The system of claim 8, wherein:
 the identification module further identifies the software component by collecting the information that identifies the installed software component;
 the information that identifies the installed software component comprises a set of text strings.

10. The system of claim 9, wherein collecting the information that identifies the installed software component comprises at least one of:
 scanning a software installation database;
 scanning at least one of the computing systems for files associated with the installed software component;
 scanning at least one of the computing systems for registry entries associated with the installed software component;
 identifying a name of the installed software component;
 identifying a publisher of the installed software component;
 identifying a version of the installed software component.

11. The system of claim 8, wherein the set of regular expressions comprises at least one of:
 a regular expression that identifies a name of the software component;
 a regular expression that identifies a publisher of the installed software component;
 a regular expression that identifies a version of the installed software component.

12. The system of claim 8, wherein the analysis module further performs at least one of:
 for each regular expression in the set of regular expressions:
  converting the regular expression to a nondeterministic finite automaton;
  running the nondeterministic finite automaton using the information that identifies the installed software component as input;
 for each regular expression in the set of regular expressions:
  converting the nondeterministic finite automaton into a deterministic finite automaton;
  running the deterministic finite automaton using the information that identifies the installed software component as input.

13. A non-transitory computer-readable-storage medium comprising one or more computer-executable instructions that, when executed by at least one processor of a computing device, cause the computing device to:
 maintain a catalog of software products that may be installed on a plurality of computing systems across an enterprise network of an enterprise, each entry in the catalog comprising a software product and a corresponding set of regular expressions;
 identify a software component installed on the computing systems across the enterprise network;
 search the product catalog for a software product that matches the installed software component by:

iterating through each entry in the catalog of software products until identifying a match based at least in part on the set of regular expressions, the first and second text strings being alternatives of one another;

while iterating through the catalog of software products, determining that the set of regular expressions corresponding to the software product matches information that identifies the installed software component by:

identifying, within the set of regular expressions corresponding to the software product, a regular expression that identifies a first text string that is required to be present for a match and a second text string that is required to be absent for a match;

determining that at least one of the first and second text strings matches the information that identifies the installed software component;

for each regular expression in the set of regular expressions, using a backtracking algorithm to determine that the regular expression matches the information that identifies the installed software component due at least in part to the first text string matching the information that identifies the installed software component and the second text string not matching the information that identifies the installed software component;

associate the installed software component with the software product whose set of regular expressions matches the information that identifies the installed software component;

create a hash of a file associated with the installed software component;

track, using the hash, usage of the software product across the enterprise network at least in part on the association between the installed software component and the software product;

continue to track, using the hash after the installed software component is patched or updated, the usage of the software product across the enterprise network at least in part on the association between the installed software component and the software product;

provide, for presentation to an Information Technology administrator, licensing information about existing licenses for the software product tracked across the enterprise network to enable the Information Technology administrator to make informed decisions on future licensing agreements.

14. The non-transitory computer-readable-storage medium of claim 13, wherein the one or more computer executable instructions are programmed to determine that the set of regular expressions corresponding to the software product matches the information that identifies the installed software component by, for each regular expression in the set of regular expressions:

converting the regular expression to a finite automaton;

running the finite automaton using the information that identifies the installed software component as input.

* * * * *